United States Patent [19]

Ledebuhr

[11] Patent Number: 4,911,547
[45] Date of Patent: Mar. 27, 1990

[54] COMPACT OPTICAL SYSTEM FOR A SINGLE LIGHT VALVE PROJECTOR USING TWO AXES OF POLARIZATION

[75] Inventor: Arno G. Ledebuhr, Pleasanton, Calif.
[73] Assignee: Hughes Aircraft Company, Los Angeles, Calif.
[21] Appl. No.: 362,734
[22] Filed: Jun. 7, 1989
[51] Int. Cl.⁴ .............................................. G02F 1/13
[52] U.S. Cl. ....................................... 353/31; 353/34; 350/337
[58] Field of Search ..................... 353/31, 34, 37, 122; 350/331 R, 337, 335

[56] References Cited

U.S. PATENT DOCUMENTS

| | | | |
|---|---|---|---|
| 4,127,322 | 11/1978 | Jacobson et al. | 353/34 |
| 4,425,028 | 1/1984 | Gagnon et al. | 353/31 |
| 4,687,301 | 8/1987 | Ledebuhr | 350/337 |
| 4,690,526 | 9/1987 | Ledebuhr | 353/31 |
| 4,715,331 | 12/1987 | Gagnon | 350/331 R |
| 4,749,259 | 6/1988 | Ledebuhr | 350/337 |
| 4,786,146 | 11/1988 | Ledebuhr | 350/331 R |
| 4,824,214 | 4/1989 | Ledebuhr | 353/31 |
| 4,826,311 | 5/1989 | Ledebuhr | 353/31 |
| 4,836,649 | 6/1989 | Ledebuhr et al. | 353/31 |
| 4,842,374 | 6/1989 | Ledebuhr | 353/31 |

Primary Examiner—William A. Cuchlinski, Jr.
Assistant Examiner—William C. Dowling
Attorney, Agent, or Firm—Wanda K. Denson-Low

[57] ABSTRACT

An optical system is disclosed which includes a first color selective prepolarizer 16 for separating light from a source into first and second beams. The first beam consists of light of a first color having a first polarization state, and the second beam consists of light of second and third colors having a first polarization state, and light of the first, second and third colors having a second polarization state. A second color selective prepolarizer 22 is provided for separating the second beam into third and fourth beams. The third beam consists of light of the second and third colors having the second polarization state. The fourth beam consists of light of the first color having the second polarization state and light of the second and third colors having the first polarization state. A main polarizer/analyzer 30 is included for separating the fourth beam into fifth and sixth beams. The fifth beam consists of light of the first color having the second polarization state and the sixth beam consists of light of the second and third colors having the first polarization state. A dichroic separator 42 is provided for separating the sixth beam into seventh and eighth beams. The seventh beam consists of light of the second color having the first polarization state and the eighth beam consists of light of the third color having the first polarization state. The invention directs the fifth, seventh and eighth beams, consisting of green, red and blue light respectively in parallel relation toward a single light valve. Polarization modulated light is returned from the light valve for full color projection.

8 Claims, 3 Drawing Sheets

COMPACT OPTICAL SYSTEM FOR A SINGLE LIGHT VALVE PROJECTOR USING TWO AXES OF POLARIZATION

BACKGROUND OF THE INVENTION

1. Field of the Invention:

This invention relates to liquid crystal light valve (LCLV) projectors. More specifically, this invention relates to optical arrangements used in full color LCLV image projectors.

While the present invention is described herein with reference to an illustrative embodiment for a particular application, it is understood that the invention is not limited thereto. Those having ordinary skill in the art and access to the teachings provided herein will recognize additional modifications, applications and embodiments within the scope of the present invention.

2. Description of the Related Art:

The development of the liquid crystal light valve has facilitated substantial progress in the state of the art of high quality large screen projection systems. The reflective mode liquid crystal light valve is a thin film multilayer structure comprising a liquid crystal layer, a dielectric mirror, a light blocking layer, and a photoresponsive layer sandwiched between two transparent electrodes. A polarized projection beam is directed through the liquid crystal layer to the dielectric mirror. An input image of low intensity light, such as that generated by a cathode ray tube is then applied to the photoresponsive layer thereby switching the electric field across the electrodes from the photoresponsive layer onto the liquid crystal layer to activate the liquid crystal. The beam of linearly polarized projection light reflected from the dielectric mirrors is polarization modulated in accordance with the input image incident on the photoconductor from a source of writing light such as a cathode ray tube (CRT). Therefore, the light valve will convert a high intensity beam of polarized light into a polarization modulated replica of a high resolution input image. (U.S. Pat. No. 4,019,807 issued to D. D. Boswell on Apr. 26, 1977 disclosed such a high performance reflective mode liquid crystal light valve.) The resultant beam of high intensity polarization modulated light can be projected with magnification to produce a high brightness image on a viewing screen.

The first large screen projection systems based on liquid crystal light valve technology produced a projection image which was essentially monochromatic. A single light valve was used to modulate the polarization state of a monochromatic beam. Such a system is described in an article entitled "Application of the Liquid Crystal Light Valve to a Large Screen Graphics Display", published in the 1979 Society for Information Display (SID), International Symposium, Digest of Technical Papers, May 1979, pp. 22-33. The display system described in this paper projects a large scale image having yellow-white characters on a dark blue background.

Subsequent advances in the art have led to the development of full color large screen projection systems using multiple liquid crystal light valves. (See U.S. Pat. No. 4,425,028 issued to R. J. Gagnon and R. T Carson on Jan. 10, 1984.) These full color projection systems typically direct three beams of polarized light to three separate liquid crystal light valves. Each light valve is controlled by the input image received from a separate CRT. Thus, the light valves provide three high intensity polarization modulated beams which are recombined for projection.

These conventional full color liquid crystal light valve image projection systems direct separate red, green and blue beams of polarized light in at least two directions. As the liquid crystal surface of a light valve must be oriented at a ninety degree angle with respect to the incident light beam, this necessitates the use of physically separate, individual light valves oriented in at least two different directions. As liquid crystal light valves are somewhat costly, the use of multiple light valves adds significantly to the cost of the LCLV projection system.

Accordingly, there is a need in the art for a compact optical arrangement for full color liquid crystal light valve image projection which would not require multiple liquid crystal light valves.

SUMMARY OF THE INVENTION

The need in the art is addressed by the present invention which provides a single light valve, full color image projection system using two axes of polarization.

The invention includes a first color selective prepolarizer for separating light from a source into first and second beams. The first beam consists of light of a first color having a first polarization state, and the second beam consists of light of second and third colors having a first polarization state, and light of the first, second and third colors having a second polarization state.

A second color selective prepolarizer is provided for separating the second beam into third and fourth beams. The third beam consists of light of the second and third colors having the second polarization state. The fourth beam consists of light of the first color having the second polarization state and light of the second and third colors having the first polarization state.

A main polarizer/analyzer is included for separating the fourth beam into fifth and sixth beams. The fifth beam consists of light of the first color having the second polarization state and the sixth beam consists of light of the second and third colors having the first polarization state. A dichroic separator is provided for separating the sixth beam into seventh and eighth beams. The seventh beam consists of light of the second color having the first polarization state and the eighth beam consists of light of the third color having the first polarization state. The invention directs the fifth, seventh and eighth beams, consisting of green, red and blue light respectively in parallel relation toward a common surface.

DESCRIPTION OF THE INVENTION

Figure 1A:
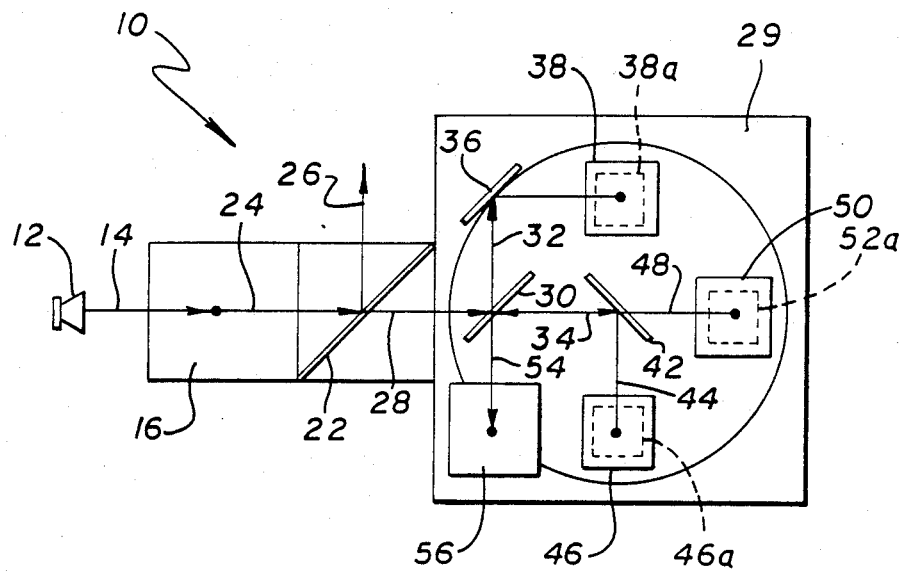
FIG. 1A is a top view of an illustrative embodiment of the optical arrangement of the present invention.
Figure 1B:
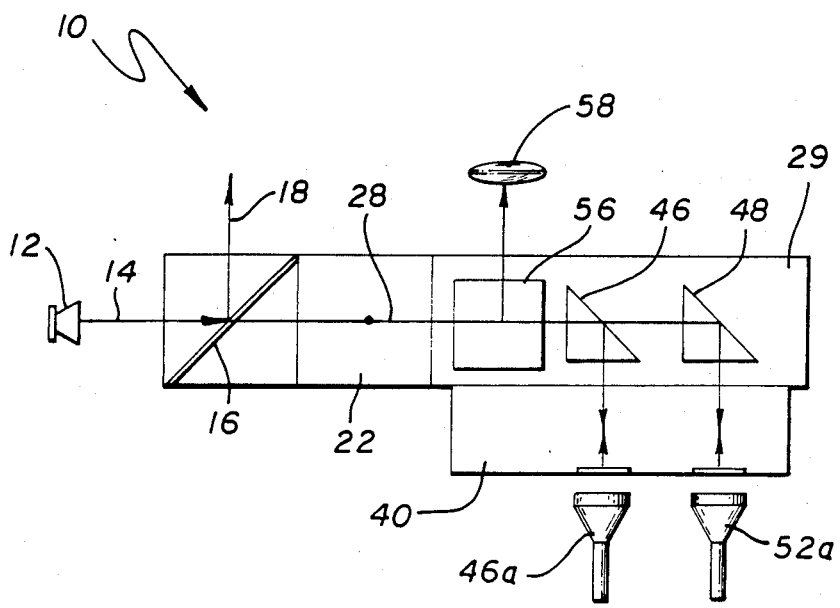
FIG. 1B is a side view the illustrative embodiment of the optical arrangement of the present invention.

As shown in the illustrative embodiment of FIG. 1A, the optical arrangement 10 of the present invention includes a source 12 of high intensity white light such as a xenon arc lamp. The source 12 projects a beam of unpolarized white light 14 toward a first color selective prepolarizer 16. As shown in the side view of FIG. 1B., the first color selective prepolarizer 16 separates the beam of unpolarized white light 14 into a first beam 18 consisting of vertically polarized green light and a second beam 24 consisting of vertically polarized red and blue light, and horizontally polarized red, green and blue light. The first color selective prepolarizer 16 reflects the first beam of vertically polarized green light 18 out of the system to an optical dump (not shown) and transmits the second beam 20 to a second color selective prepolarizer 22 which is rotated 90 degrees with respect to the first color selective prepolarizer 16.

As shown in FIG. 1A, the second color selective prepolarizer 22 separates the second beam 20 into a third beam 26 consisting of horizontally polarized red and blue light and a fourth beam 28 consisting of vertically polarized red and blue light and horizontally polarized green light. The second color selective prepolarizer 22 reflects the third beam 26 of horizontally polarized red and blue light out of the system to an optical dump (not shown), and transmits the fourth beam 28 to a main polarizer/analyzer 30 located in a tank 29 filled with an index matching fluid.

Thus, the first and second color selective prepolarizers 16 and 22 effectively convert the beam 14 of high intensity unpolarized white light from the source 12 into the fourth beam 28 which consists of horizontally polarized green light and vertically polarized red and blue light. As described below, other optical components separate the fourth beam 28 into individual beams of green, red and blue light.

Figure 2A:
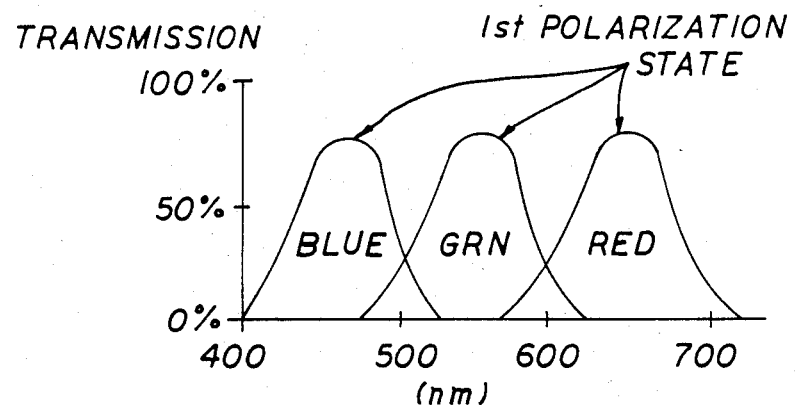
FIG. 2A is a graphical illustration of the passbands of three color selective filters utilized in the illustrative embodiment of the optical arrangement of the present invention.
Figure 2B:
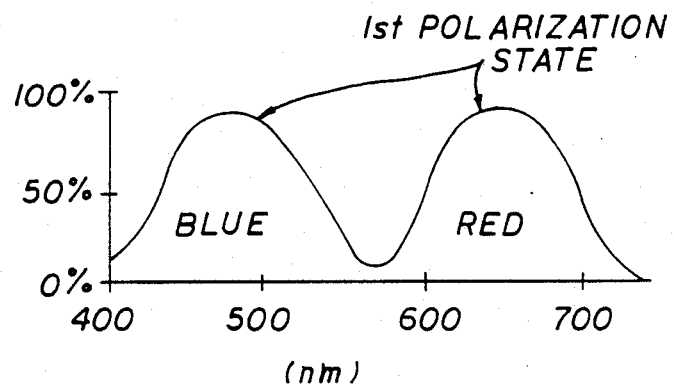
FIG. 2B is a graphical illustration of the passbands of two color selective filters utilized in the illustrative embodiment of the optical arrangement of the present invention.

As illustrated in FIGS. 2A and 2B, the separate polarization states of the green component from the red and blue components of the fourth beam 28 allow the subsequent color separating components of the present invention to be designed in an optimal manner. FIG. 2A is a graph of the passbands of three color selective filters which could be used to separate a beam of white light having a single polarization state into blue, green and red beams having the same polarization state. As shown in FIG. 2A, when light of a single polarization state is used, the passbands of each color selective filter must be narrow enough to prevent substantial overlapping of the passband of an adjacent filter. This restriction has the effect of reducing the intensity of the colored light transmitted by each color selective filter accordingly.

Figure 2C:
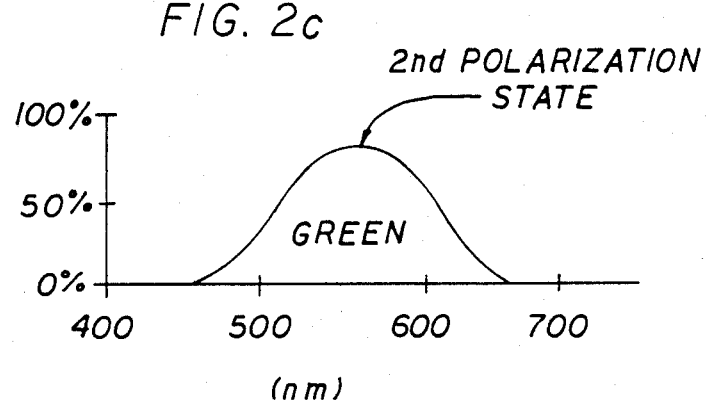
FIG. 2C is a graphical illustration of the passband of a color selective filter utilized in the illustrative embodiment of the optical arrangement of the present invention.

One solution to this problem is to separate a beam of white light into a first beam of red and blue light having a first polarization state, and a second beam of green light having a second polarization state, as shown in FIGS. 2B and 2C respectively. This would allow each color selective filter to be designed with a larger passband, which, in turn, would increase the intensity of the light transmitted by each color selective filter and thus increase the intensity of the projection system.

Figure 3A:
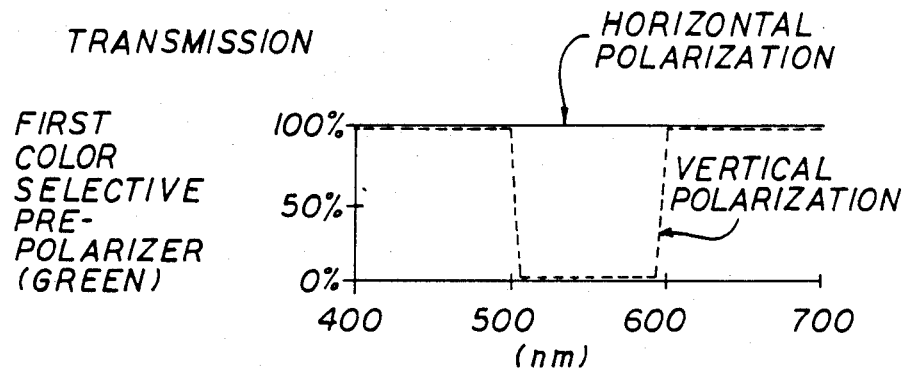
FIG. 3A illustrates the transmission curve of a first color selective prepolarizer utilized in the illustrative embodiment of the present invention.
Figure 3B:
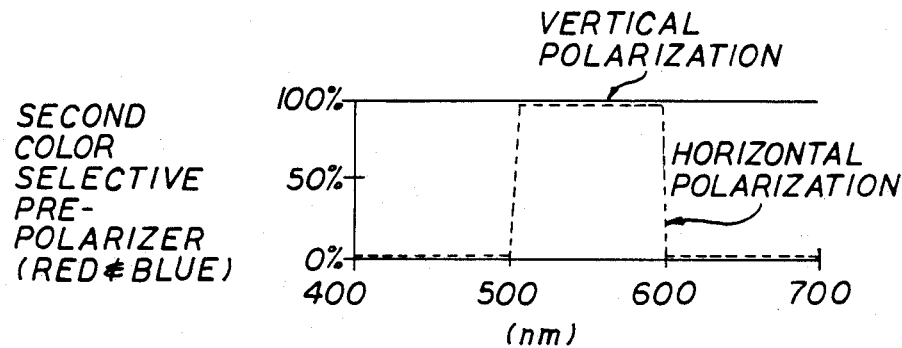
FIG. 3B illustrates the transmission curve of a second color selective prepolarizer utilized in the illustrative embodiment of the present invention.

The first and second color selective prepolarizers 16 and 22 implement this technique by converting the input beam 14 of unpolarized white light into the fourth beam 28 consisting of horizontally polarized green light and vertically polarized red and blue light. The transmission curves for the first and second prepolarizers are shown in FIGS. 3A and 3B respectively. As shown in FIGS. 3A and 3B, the first color selective prepolarizer 16 reflects vertically polarized green light, while the second color selective prepolarizer 22 reflects horizontally polarized red and blue light. This leaves a fourth beam with horizontally polarized green and vertically polarized red and blue components. It should be noted that the second color selective prepolarizer 22 is designed to reflect vertically polarized red and blue light. However, as the second color selective prepolarizer 22 is rotated 90 degrees with respect to the first color selective prepolarizer 16, the second prepolarizer 22 effectively reflects horizontally polarized red and blue components of the input beam 20.

The main polarizer/analyzer 30 separates the fourth beam 28 from the second color selective prepolarizer 22, into a fifth beam 32 of horizontally polarized green light, and a sixth beam 34 of vertically polarized red and green light. The main polarizer/analyzer 30 reflects the fifth beam 32 of horizontally polarized green light toward a first fold mirror 36 which then reflects the fifth beam 32 toward a first fold prism 38. The first fold prism 38 directs the fifth beam 32 of horizontally polarized green light, from the first fold mirror 36, to a first region of the liquid crystal layer of a light valve 40 mounted beneath the first fold prism 38.

Figure 3C:
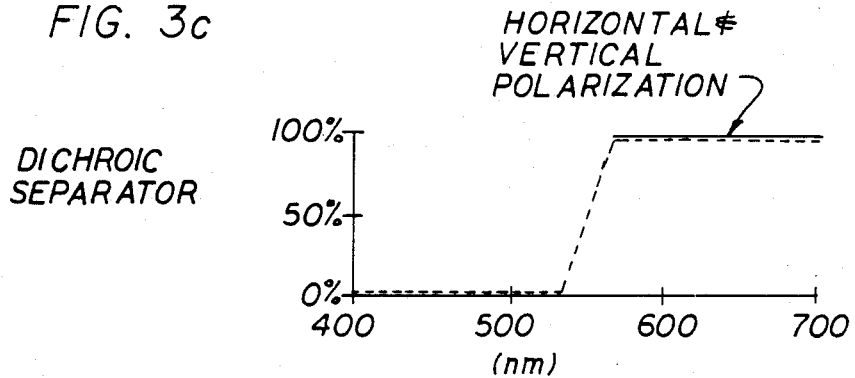
FIG. 3C illustrates the transmission curve of a dichroic separator utilized in the illustrative embodiment of the present invention.

The main polarizer/analyzer 30 transmits the sixth beam 34 of vertically polarized red and blue light toward a dichroic separator 42. As shown in FIG. 3C, the dichroic separator 42 is designed to reflect blue light (wavelengths from 400 to 550 nm) and to transmit red (wavelengths from 550 to 700 nm) of both vertical and horizontal polarization. The crossover point (550 nm) of the dichroic separator 42 is placed in the center of the green band. This assures that any edge splitting effects between the polarization components will occur where there is no light. This advantageous design is permitted by the optical arrangement of the present invention by which the sixth beam 34 includes red and blue light only.

Thus, the dichroic separator 42 separates the sixth beam 34 into a seventh beam 44 of vertically polarized blue light, and an eighth beam 48 of vertically polarized red light. The dichroic separator 42 reflects the seventh beam 44 of vertically polarized blue light toward a second fold prism 46. The second fold prism 46 then directs the seventh beam 44 toward a second region of the light valve 40 mounted beneath the second fold prism 46. The dichroic separator 42 directs the eighth beam 48 of vertically polarized red light toward a third fold prism 50. The third fold prism 50 then directs the eighth beam 48 toward a third region of the light valve 40 mounted beneath the third fold prism 50. Note that first, second and third fold prisms 38, 46 and 50 are used to direct the fifth, seventh and eighth beams 32, 44, 48 of green, blue and red light, respectively, to the light valve 40 to ensure that each beam has the same path length especially from the reflecting surface of the fold prisms to the surface of the light valve 40. This, in turn, insures that the beams may be optimally recombined as discussed more fully below.

Thus, the fifth, seventh and eighth beams 32, 44, 48 of green, blue and red light, respectively, are directed in parallel relation toward the light valve 40 mounted beneath the plane common to the first, second and third fold prisms 38, 46, 50. The fifth beam 32 of green light is incident on the first region of the light valve 40. The seventh beam of blue light 44 is incident on the second region of the light valve 40. And the eighth beam 48 of red light is incident on the third region of the light valve 40. The fifth, seventh and eighth beams 32, 44, 48 incident on the light valve 40 are each polarization modulated in accordance with writing light provided by first, second and third cathode ray tubes 38a, 46a, and 52a which illuminate the photosensitive layer at the first, second and third regions, respectively, of the light valve 40.

The fifth beam 32 of polarization modulated green light returned from the light valve 40 retraces its path through the first fold prism 38 to the first fold mirror 36. The first fold mirror 36 reflects the fifth beam 32 of polarization modulated green light toward the main polarizer analyzer 30. The seventh beam 44 of polarization modulated blue light returned from the light valve 40 retraces its path through the second fold prism 46 to the dichroic separator 42 by which it is reflected to the main polarizer/analyzer 30. The eighth beam 48 of polarization modulated red light returned from the light valve 40 retraces its path through the third fold prism 50 to the dichroic separator 42 which transmits it to the main polarizer/analyzer 30.

The main polarizer/analyzer 30 recombines the polarization modulated fifth, seventh and eighth beams 32, 44 and 48 returned from the light valve 40 into a single output beam 54 comprised of brightness modulated green, blue and red light. The main polarizer/analyzer 30 directs the output beam 54 toward, a second fold mirror 56 which reflects the output beam 54 toward projection optics 58 for projection on a viewing screen in a conventional manner. In the preferred embodiment, the main polarizer/analyzer 30, fold mirrors 36 and 56, dichroic separator 42 and fold prisms 38, 46 and 50 are be mounted in a tank 29 filled with index matching fluid as is common in the art.

Thus, the present invention has been described herein with reference to a particular embodiment for a particular application. Nonetheless, the invention is not limited thereto. Those of ordinary skill in the art and access to the teachings provided herein will recognize additional modifications, applications, and embodiments within the scope thereof. For example, while it is contemplated that the polarizing beam splitters utilized in the illustrative embodiment of the invention would be polarization selective light dividing interference coatings or multi-refractive layer devices of the type described in U. S. Pat. No. 2,403,431. issued Jul. 9, 1946 to MacNeille, the invention is not limited thereto. Further, the optical components may be located in separate cubes instead of a common tank. In addition, the polarization/color assignments may be interchanged without departing from the scope of the invention.

It is intended by the appended claims to cover any and all such modifications, applications, and embodiments within the scope of the invention.

Accordingly,

What is claimed is:

1. An optical arrangement comprising:
   first color selective prepolarizer means for separating light from a source into first and second beams, said first beam consisting of light of a first color, having a first polarization state, and said second beam consisting of light of a first color having a second polarization state and light of second and third colors of first and second polarization states;
   second color selective prepolarizer means for separating said second beam into a third and fourth beam, said third beam consisting of light of said second and third color having said first polarization state and said fourth beam consisting of light of said first color having said second polarization state and light of said second and third colors having said first polarization state;
   main polarizer/analyzer means for separating said fourth beam into fifth and sixth beams, said fifth beam consisting of light of said first color having said second polarization state and said sixth beam consisting of light of said second and third colors having said first polarization state;
   dichroic separator means for separating said sixth beam into seventh and eighth beams, said seventh beam consisting of light of said second color having said first polarization state and said eighth beam consisting of light of said third color having said first polarization state; and
   means for directing said fifth, seventh and eighth beams in parallel toward a common surface.

2. The optical arrangement of claim 1 wherein said means for directing said fifth, seventh and eighth beams includes first, second and third fold prisms and a first fold mirror.

3. The optical arrangement of claim 1 including a light valve mounted at said common surface.

4. The optical arrangement of claim 3 wherein said means for directing said fifth, seventh and eighth beams includes first, second and third fold prisms and a first fold mirror.

5. An optical arrangement for use in a full color image projection system including a source of light energy, a single light valve, and a projection lens, said arrangement comprising:
   first color selective prepolarizer means for separating unpolarized light from a source into first and second beams, said first beam consisting of light of a first color having a first polarization state and said second beam consisting of light of a first color having a second polarization state and unpolarized light of a second and third color;
   second color selective prepolarizer means for separating said second beam into a third and fourth beam, said third beam consisting of light of said second and third color having said first polarization state and said fourth beam consisting of light of said first color having said second polarization state and light of said second and third colors having said first polarization state;
   main polarizer/analyzer means for separating said fourth beam into fifth and sixth beams, said fifth beam consisting of light of said first color having said second polarization state and said sixth beam consisting of light of said second and third colors having said first polarization state;
   dichroic separator means for separating said sixth beam into seventh and eighth beams, said seventh beam consisting of light of said second color having said first polarization state and said eighth beam consisting of light of said third color having said first polarization state;

means for directing said fifth, seventh and eighth beams in parallel toward a common surface.

6. The optical arrangement of claim 5 wherein said common surface is a single light valve.

7. The optical arrangement of claim 6 wherein said means for directing said fifth, seventh and eighth beams includes a first, second and third fold prism and a first fold mirror.

8. The optical arrangement of claim 7 wherein light from said fifth, seventh and eighth beams incident on said single light valve are polarization modulated by writing light from first, second and third cathode ray tubes respectively.

* * * * *